United States Patent
Kaspar et al.

(10) Patent No.: US 7,064,170 B2
(45) Date of Patent: Jun. 20, 2006

(54) EMULSIFIER FREE AQUEOUS EMULSION POLYMERIZATION TO PRODUCE COPOLYMERS OF A FLUORINATED OLEFIN AND HYDROCARBON OLEFIN

(75) Inventors: Harald Kaspar, Burgkirchen (DE); Peter J. Scott, Madison, AL (US); Klaus Hintzer, Kastl (DE); Gernot Löhr, Burgkirchen (DE)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/690,088

(22) Filed: Oct. 21, 2003

(65) Prior Publication Data

US 2004/0087703 A1 May 6, 2004

Related U.S. Application Data

(60) Provisional application No. 60/422,770, filed on Oct. 31, 2002.

(51) Int. Cl.
*C08F 12/20* (2006.01)

(52) U.S. Cl. ............... 526/249; 526/242; 526/250; 524/805

(58) Field of Classification Search ............ 526/242, 526/249, 250; 524/805
See application file for complete search history.

(56) References Cited

U.S. PATENT DOCUMENTS

| | | | |
|---|---|---|---|
| 2,567,011 A | 9/1951 | Diesslin et al. | |
| 2,732,398 A | 1/1956 | Brice et al. | |
| 2,809,990 A | 10/1957 | Brown | |
| 3,345,317 A * | 10/1967 | Zuzaemon | 524/742 |
| 3,462,401 A * | 8/1969 | Fumoto et al. | 526/206 |
| 3,825,510 A | 7/1974 | Yamamoto et al. | |
| 3,876,654 A | 4/1975 | Pattison | |
| 4,000,356 A | 12/1976 | Weisgerber et al. | |
| 4,025,481 A * | 5/1977 | Tournut et al. | 524/793 |
| 4,029,868 A | 6/1977 | Carlson | |
| 4,148,982 A | 4/1979 | Morozumi et al. | |
| 4,214,060 A | 7/1980 | Apotheker et al. | |
| 4,233,421 A | 11/1980 | Worm | |
| 4,243,770 A | 1/1981 | Tatemoto et al. | |
| 4,277,586 A * | 7/1981 | Ukihashi et al. | 526/93 |
| 4,282,162 A | 8/1981 | Kuhls | |
| 4,439,385 A | 3/1984 | Kuhls et al. | |
| 4,463,144 A | 7/1984 | Kojima et al. | |
| 4,745,165 A | 5/1988 | Arcella et al. | |
| 4,831,085 A | 5/1989 | Okabe et al. | |
| 4,864,006 A | 9/1989 | Giannetti et al. | |
| 4,912,171 A | 3/1990 | Grootaert et al. | |
| 5,001,278 A * | 3/1991 | Oka et al. | 568/615 |
| 5,086,123 A | 2/1992 | Guenthner et al. | |
| 5,262,490 A | 11/1993 | Kolb et al. | |
| 5,285,002 A | 2/1994 | Grootaert | |
| 5,453,477 A * | 9/1995 | Oxenrider et al. | 526/230 |
| 5,565,512 A | 10/1996 | Saito et al. | |
| 5,591,804 A | 1/1997 | Coggio et al. | |
| 5,668,221 A | 9/1997 | Saito et al. | |
| 5,677,389 A | 10/1997 | Logothetis et al. | |
| 5,929,169 A | 7/1999 | Jing et al. | |
| 5,955,556 A * | 9/1999 | McCarthy et al. | 526/249 |
| 5,973,091 A | 10/1999 | Schmiegel | |
| 6,380,337 B1 | 4/2002 | Abe et al. | |
| 6,429,258 B1 * | 8/2002 | Morgan et al. | 524/805 |
| 6,642,307 B1 | 11/2003 | Sogabe et al. | |
| 6,693,152 B1 * | 2/2004 | Kaspar et al. | 526/78 |
| 6,716,942 B1 * | 4/2004 | Saito et al. | 526/242 |
| 6,825,250 B1 | 11/2004 | Epsch et al. | |

FOREIGN PATENT DOCUMENTS

| | | | |
|---|---|---|---|
| EP | 0 101 930 A2 | | 3/1984 |
| EP | 0 320 156 A2 | | 6/1989 |
| EP | 320156 A2 | * | 6/1989 |
| EP | 0 407 937 A1 | | 1/1991 |
| EP | 0 446 725 A1 | | 9/1991 |
| EP | 446725 A1 | * | 9/1991 |
| EP | 0 661 304 A1 | | 7/1995 |
| EP | 0 769 521 A1 | | 4/1997 |
| EP | 0 784 064 A1 | | 7/1997 |
| GB | 1291936 | | 10/1972 |
| WO | WO 96/24622 | | 8/1996 |
| WO | WO-97/17381 | * | 5/1997 |
| WO | WO 97/17381 | | 5/1997 |
| WO | WO 00/09603 | | 2/2000 |
| WO | WO 00/32655 | | 6/2000 |
| WO | WO 00/35971 | | 6/2000 |
| WO | WO-2004/041878 A1 | * | 5/2004 |

* cited by examiner

*Primary Examiner*—David W. Wu
*Assistant Examiner*—Henry S. Hu
(74) *Attorney, Agent, or Firm*—Brian E. Szymanski

(57) ABSTRACT

Provided is a process for making a copolymer of fluorinated olefin and hydrocarbon olefin selected from ethylene, propylene and mixtures thereof, the process comprising a substantially emulsifier free aqueous emulsion polymerization of said fluorinated olefin and said hydrocarbon olefin, optionally in the presence of fluoropolymer particles and/or fluorinated liquid in a form suitable to improve the copolymerization of fluorinated olefin and hydrocarbon olefin.

13 Claims, No Drawings

EMULSIFIER FREE AQUEOUS EMULSION POLYMERIZATION TO PRODUCE COPOLYMERS OF A FLUORINATED OLEFIN AND HYDROCARBON OLEFIN

CROSS REFERENCE TO RELATED APPLICATION

This application claims priority to U.S. Provisional Patent Application No. 60/422,770, filed Oct. 31, 2002.

FIELD OF THE INVENTION

The present invention relates to an emulsifier free aqueous emulsion polymerization of a fluorinated olefin and a hydrocarbon olefin to produce a copolymer of the fluorinated and hydrocarbon olefin. In particular, the present invention relates to a process for making a fluoropolymer that is a copolymer of a fluorinated olefin such as tetrafluoroethylene or chlorotrifluoroethylene and ethylene or propylene. Such fluoropolymers find application for example in the making of fluoroelastomers.

BACKGROUND OF THE INVENTION

Fluoropolymers, i.e. polymers having a fluorinated backbone, have been long known and have been used in a variety of applications because of several desirable properties such as heat resistance, chemical resistance, weatherability, UV-stability etc. The various fluoropolymers are for example described in "Modern Fluoropolymers", edited by John Scheirs, Wiley Science 1997.

A particular type of fluoropolymers comprises copolymers of a fluorinated olefin and ethylene and/or propylene. Fluoropolymers of fluorinated olefins and ethylene or propylene have been described in for example U.S. Pat. No. 4,277,586, GB 1,291,936, U.S. Pat. Nos. 3,825,510, 4,463,144 and 4,148,982. According to the teachings of these publications, copolymers of a fluorinated olefin such as for example tetrafluoroethylene (TFE) and ethylene (E) or propylene (P) can be prepared through various polymerization methods including aqueous emulsion polymerization. Generally, the aqueous emulsion polymerization is conducted in the presence of a fluorinated surfactant as is disclosed in for example U.S. Pat. Nos. 4,277,586 and 4,463,144.

Although the aqueous emulsion polymerization is generally conducted in the presence of a fluorinated surfactant, aqueous emulsion polymerization processes have recently also been developed that avoid the use of a fluorinated surfactant. Such polymerization processes offer the advantage that the resulting product is free of the fluorinated surfactant, which may be desired from an environmental point of view. So called emulsifier free aqueous emulsion polymerizations have been disclosed in for example U.S. Pat. No. 5,453,477, WO 96/24622 and WO 97/17381.

It has however been found that the aqueous emulsion copolymerization of a fluorinated olefin with ethylene and/or propylene does not proceed well or does not proceed at all when no fluorinated surfactant is added to the polymerization. Accordingly, it would be desirable to find an improved process in which copolymers of a fluorinated olefin and a hydrocarbon olefin selected from ethylene, propylene or mixtures thereof can be readily prepared in an emulsifier free aqueous emulsion polymerization.

SUMMARY OF THE INVENTION

In one aspect, the present invention provides a process for making a copolymer of fluorinated olefin and hydrocarbon olefin selected from ethylene, propylene and mixtures thereof, the process comprising a substantially emulsifier free aqueous emulsion polymerization of said fluorinated olefin and said hydrocarbon olefin. The process further comprises copolymerization of said fluorinated olefin and hydrocarbon olefin in the presence of fluoropolymer particles and/or fluorinated liquid in a form suitable to improve the copolymerization of fluorinated olefin and hydrocarbon olefin. In particular, it was found that in the presence of fluoropolymer particles, the copolymer could be produced at good yield in a convenient and cost effective manner. Further, it was also found that when fluorinated liquid, in addition to the fluoropolymer particles or as an alternative thereof, is added to the polymerization for example as a hot gas or as an aerosol, a suitable form of the fluorinated liquid is obtained which also improves the copolymerization of the fluorinated olefin and hydrocarbon olefin.

By the term 'substantially emulsifier free aqueous emulsion polymerization' is meant that no or substantially no fluorinated surfactant is added to the polymerization system, i.e., the water phase as is commonly done in case of aqueous emulsion polymerization of fluorinated monomers. By 'substantially no fluorinated surfactant' is meant that the amount thereof added should not be more than 500 ppm (based on the amount of water in the polymerization system), preferably not more than 100 ppm and most preferably not more than 50 ppm. The term 'substantially emulsifier free aqueous emulsion polymerization' however is not intended to exclude fluorinated species that may form in-situ during the polymerization and that may function as a surfactant in that they may stabilize the fluoropolymer particles in the aqueous emulsion polymerization. Also, although, the polymerization is conducted without a fluorinated surfactant, it is distinguished from a suspension polymerization in that the polymer particles produced will typically have an average diameter as determined by dynamic light scattering techniques, between about 20 to 700 nm, preferably between 40 nm and 500 nm whereas suspension polymerization will typically produce particles sizes up to several millimeters. Also, the resulting dispersions have a similar level of stability as aqueous emulsions produced with the aid of a fluorinated surfactant, which also differentiates them from suspensions as in the latter case, the particles typically settle out of the suspension.

By the term 'fluorinated' is meant that at least some hydrogen atoms in the organic compound to which the term relates, have been replaced with fluorine. The term however is not meant to exclude the possibility that some hydrogen atoms are replaced with another halogen such as chlorine, bromine or iodine such that the compound will have in addition to fluorine atoms also chlorine, bromine and/or iodine atoms.

DETAILED DESCRIPTION OF THE INVENTION

In accordance with one embodiment of the process of the invention, the copolymer of fluorinated olefin and hydrocarbon olefin is produced in the presence of fluoropolymer particles. The fluoropolymer particles are believed to act as polymerization loci and should typically be present when copolymerization of the fluorinated olefin and hydrocarbon olefin at the feed ratio for producing the desired copolymer composition starts.

Typically, the fluoropolymer particles will have a size of not more than 200 nm, preferably not more than 150 nm, more preferably not more than 100 nm. The fluoropolymer particles can be prepared in-situ at the beginning of the polymerization process or they can be prepared separately and added to the polymerization kettle at the start of the polymerization. A convenient way to produce the fluoropolymer particles is to initiate the polymerization and feed part of the fluorinated olefin without feeding substantial amounts of the hydrocarbon olefin. By the term 'without feeding substantial amounts of the hydrocarbon olefin' is meant that either no hydrocarbon olefin is fed or that the amount thereof is sufficiently low such that fluoropolymer particles are formed. Typically the amount of hydrocarbon olefin fed for preparing the in-situ fluoropolymer particles will be such that the feeding ratio hydrocarbon olefin to fluorinated olefin is not more ½, preferably not more than ⅓ and most preferably less than ⅕ of the feed ratio of hydrocarbon olefin to fluorinated olefin necessary to produce the desired copolymer. Once the fluoropolymer particles are formed, the feed ratio of hydrocarbon olefin to fluorinated olefin can be increased to the level necessary to produce the desired fluoropolymer having the desired amount of hydrocarbon olefin. Preferably, the fluoropolymer particles are formed in-situ by polymerizing at the beginning of the polymerization process upto 20% by weight, preferably upto 10% by weight (based on the total weight of fluoropolymer to be produced) of the fluorinated olefin without co-feeding the hydrocarbon olefin. Fluoropolymer particles produced in-situ may also involve the copolymerization of further fluorinated monomers other than the fluorinated olefin, such as described below.

The fluoropolymer particles may also be prepared separately by an aqueous emulsion polymerization of fluorinated monomers including fluorinated olefins and fluorinated monomers as described below. Such aqueous emulsion polymerization may be carried out with or without addition of a fluorinated surfactant. If a fluorinated surfactant is used to prepare the fluoropolymer particles, it will be used in sufficiently low amounts such that when the fluoropolymer particles thus formed are added to the polymerization process to produce a copolymer of fluorinated and hydrocarbon olefin in connection with the invention, the amount of fluorinated surfactant added to the aqueous phase does not exceed 500 ppm, preferably not more than 100 ppm and most preferably not more than 50 ppm. Alternatively, the fluorinated surfactant contained in the fluoropolymer particle dispersion can be removed or reduced with an anion exchange resin as described in for example WO 00/35971 prior to adding the fluoropolymer particles to the polymerization kettle. When the fluoropolymer particles are produced in the presence of a fluorinated surfactant, it will be possible to produce fluoropolymer particles that contain the hydrocarbon olefin in the same or approximately the same amount as in the desired fluoropolymer.

Suitable fluorinated surfactants for separately preparing the fluoropolymer particles include the fluorinated surfactants commonly used in aqueous emulsion polymerization of gaseous fluorinated monomers. Examples of fluorinated surfactants include salts, in particular ammonium salts of linear or branched perfluoro alkyl containing carboxylic and sulphonic acids having 4 to 15 carbon atoms in the alkyl chain. Specific examples include perfluorooctanoic acid ammonium salt (APFO, described in U.S. Pat. No. 2,567,011) $C_8F_{17}SO_3Li$ which is commercially available from Bayer AG, $C_4F_9SO_3Li$ and $C_4F_9SO_3K$ (described in U.S. Pat. No. 2,732,398). A further example of a perfluoroalkyl containing carboxylic acid salt is $C_8F_{17}SO_2N(C_2H_5)CH_2COOK$ (described in U.S. Pat. No. 2,809,990).

Depending on the intended application of the final copolymer, the fluoropolymer particles may be amorphous or crystalline. For example, when the copolymer is intended for making an elastomer, the copolymer will preferably be amorphous and the fluoropolymer particles used are then preferably also amorphous. Nevertheless, even if an amorphous polymer is desired, the use of crystalline or semi-crystalline fluoropolymer particles is not excluded, particularly if the amount that is used thereof is low.

The amount of fluoropolymer particles added to the polymerization kettle will typically be between 0.5% by weight and 10% by weight based on the total weight of the polymerization system (i.e. water and any other compound added such as initiator, monomers and auxiliary compounds such as buffering agents) at the start of the polymerization. A convenient amount of fluoropolymer particles will not exceed 2.5% to 5% by weight based on the total weight of the polymerization system at the start of the polymerization.

Alternatively, in lieu of or in addition to using fluoropolymer particles, a fluorinated liquid can be used. By the term 'liquid' is meant that the compound should be liquid at the conditions of temperature and pressure employed in the polymerization process. Typically the fluorinated liquid has a boiling point of at least 50° C., preferably at least 80° C. at atmospheric pressure. Fluorinated liquids include in particular highly fluorinated hydrocarbons as well as liquid fluorinated monomers. The term 'highly fluorinated' in connection with the present invention is used to indicate compounds in which most and preferably all hydrogen atoms have been replaced with fluorine atoms as well as compounds wherein the majority of hydrogen atoms have been replaced with fluorine atoms and where most or all of the remainder of the hydrogen atoms has been replaced with bromine, chlorine or iodine. Typically, a highly fluorinated compound in connection with this invention will have only few, e.g., 1 or 2 hydrogen atoms replaced by a halogen other than fluorine and/or have only one or two hydrogen atoms remaining. When not all hydrogen atoms are replaced by fluorine or another halogen, i.e., the compound is not perfluorinated, the hydrogen atoms should generally be in a position on the compound such that substantially no chain transfer thereto occurs, i.e., such that the compound acts as an inert in the polymerization, i.e., the compound does not participate in the free radical polymerization. Compounds in which all hydrogens have been replaced by fluorine and/or other halogen atoms are herein referred to as 'perfluorinated'.

Liquid and fluorinated hydrocarbon compounds that can be used as fluorinated liquid, typically comprise between 3 and 25 carbon atoms, preferably between 5 and 20 carbon atoms and may contain up to 2 heteroatoms selected from oxygen, sulfur or nitrogen. Preferably the highly fluorinated hydrocarbon compound is a perfluorinated hydrocarbon compound. Suitable perfluorinated hydrocarbons include perfluorinated saturated linear, branched and/or cyclic aliphatic compounds such as a perfluorinated linear, branched or cyclic alkane; a perfluorinated aromatic compound such as perfluorinated benzene, or perfluorinated tetradecahydro phenanthene. It can also be a perfluorinated alkyl amine such as a perfluorinated trialkyl amine. It can further be a perfluorinated cyclic aliphatic, such as decalin; and preferably a heterocyclic aliphatic compound containing oxygen or sulfur in the ring, such as perfluoro-2-butyl tetrahydrofuran.

Specific examples of perfluorinated hydrocarbons include perfluoro-2-butyltetrahydrofuran, perfluorodecalin, perfluoromethyldecalin, perfluoromethylcyclohexane, perfluoro(1,3-dimethylcyclohexane), perfluorodimethyldecahydronaphthalene, perfluorofluoorene, perfluoro (tetradecahydrophenanthrene), perfluorotetracosane, perfluorokerosenes, octafluoronaphthalene, oligomers of poly(chlorotrifluoroethylene), perfluoro(trialkylamine) such as perfluoro(tripropylamine), perfluoro(tributylamine), or perfluoro(tripentylamine), and octafluorotoluene, hexafluorobenzene, and commercial fluorinated solvents, such as Fluorinert FC-75, FC-72, FC-84, FC-77, FC-40, FC-43, FC-70, FC 5312 or FZ 348 all produced by 3M Company. It will further be clear to one skilled in the art that a mixture of perfluorinated hydrocarbons can be used to prepare the micro-emulsion. A suitable inert liquid and highly fluorinated hydrocarbon compound is $C_3F_7$—O—$CF(CF_3)$—$CF_2$—O—CHF—$CF_3$.

The fluorinated liquid may also comprise liquid fluorinated monomer alone or in combination with above described liquid fluorinated compounds. Examples of liquid fluorinated monomers include monomers that are liquid under the polymerization conditions and that are selected from (per)fluorinated vinyl ethers, (per)fluorinated allyl ethers and (per)fluorinated alkyl vinyl monomers. According to a particular embodiment, the liquid fluorinated monomer may comprise a so-called cure site that can be used to cause cross-linking of the fluoropolymer. Such a cure-site may comprise a halogen such chlorine, bromine or iodine or alternatively may comprise a nitrile group.

The fluorinated liquid should be in a form suitable to improve the copolymerization of the fluorinated olefin and hydrocarbon olefin. A suitable form can be obtained by introducing the fluorinated compound in its gaseous state in the polymerization kettle, i.e., as a so-called hot gas. Alternatively, a suitable form of the fluorinated liquid may be obtained by introducing the fluorinated liquid into the polymerization kettle as an aerosol by feeding the fluorinated liquid through an appropriate nozzle forming the aerosol. In a particular embodiment, the nozzle may be steam heated. The fluorinated liquid is typically used in an amount of 0.001 to 3% by weight based on the weight of fluoropolymer to be produced, preferably 0.005 to 1.5% by weight.

Copolymers that can be produced with the process of the invention comprise repeating units deriving from the fluorinated olefin and repeating units deriving from ethylene and/or propylene. Examples of fluorinated olefins that can be used include tetrafluoroethylene (TFE), chlorotrifluoroethylene (CTFE), hexafluoropropylene (HFP) and vinylidene fluoride (VDF). Preferably the copolymer will have between 10 and 70 mole % of units deriving from ethylene and/or propylene, more preferably between 15 and 50 mole % and most preferably between 20 and 45 mole %. When VDF is used, it is generally used in an amount of not more than 50 mole %, preferably not more than 40 mole %. In addition to the fluorinated olefin and hydrocarbon olefin, the copolymer may also comprise units deriving from other fluorinated and non-fluorinated monomers. Examples of further fluorinated monomers that can be used include fluorinated allyl ethers and fluorinated vinyl ethers, in particular perfluorinated vinyl ethers (PVE).

Examples of perfluorinated vinyl ether monomers include those corresponding to the formula:

$CF_2$=CF—O—$R_f$ wherein $R_f$ represents a perfluorinated aliphatic group that may contain one or more oxygen atoms. Preferably, the perfluorovinyl ethers correspond to the general formula:

$CF_2$=$CFO(R_fO)_n(R'_fO)_mR''_f$ wherein $R_f$ and $R'_f$ are different linear or branched perfluoroalkylene groups of 2–6 carbon atoms, m and n are independently 0–10, and $R''_f$ is a perfluoroalkyl group of 1–6 carbon atoms.

Examples of perfluorovinyl ethers according to the above formulas include perfluoro-2-propoxypropylvinyl ether (PPVE-2), perfluoro-3-methoxy-n-propylvinyl ether, perfluoro-2-methoxy-ethylvinyl ether, perfluoromethylvinyl ether (PMVE), perfluoro-n-propylvinyl ether (PPVE-1) and $CF_3$—$(CF_2)_2$—O—$CF(CF_3)$—$CF_2$—O—$CF(CF_3)$— $CF_2$—O—CF=$CF_2$.

When it is desired to include cure-sites into the copolymer, the polymerization may involve copolymerization of a fluorinated monomer that comprises a cure-site such a halogen capable of participating in a peroxide cure reaction or a nitrile group. In order to introduce halogens, which are capable of participation in the peroxide cure reaction, along the chain, the copolymerization of the basic monomers of the fluoropolymer may be carried out with a suitable fluorinated cure-site monomer (see for instance U.S. Pat. Nos. 4,745,165, 4,831,085, and 4,214,060). Such comonomer can be selected for instance from:

(a) bromo- or iodo-(per)fluoroalkyl-(per)fluorovinylethers having the formula:

Z-$R_f$—O—CX=$CX_2$ wherein each X may be the same or different and represents H or F, Z is Br or I, $R_f$ is a (per)fluoroalkylene $C_1$–$C_{12}$, optionally containing chlorine and/or ether oxygen atoms; for example: $BrCF_2$—O—CF=$CF_2$, $BrCF_2CF_2$—O—CF=$CF_2$, $BrCF_2CF_2CF_2$—O—CF=$CF_2$, $CF_3CFBrCF_2$—O—CF=$CF_2$, and the like; and (b) bromo- or iodo containing fluoroolefins such as those having the formula:

Z'-$(R_f')_r$—CX=$CX_2$, wherein each X independently represents H or F, Z' is Br or I, $R_f'$ is a perfluoroalkylene $C_1$–$C_{12}$, optionally containing chlorine atoms and r is 0 or 1; for instance: bromotrifluoroethylene, 4-bromo-perfluorobutene-1, and the like; or bromofluoroolefins such as 1-bromo-2,2-difluoroethylene and 4-bromo-3,3,4,4-tetrafluorobutene-1.

Alternatively or additionally, cure-site components in the fluoropolymer may derive from nitrile containing fluorinated monomers. Examples of nitrile containing monomers that may be used correspond to one of the following formulas:

$CF_2$=CF—$CF_2$—O—$R_f$—CN $CF_2$=$CFO(CF_2)_L$CN $CF_2$=$CFO[CF_2CF(CF_3)O]_g(CF_2)_vOCF(CF_3)$CN $CF_2$=$CF[OCF_2CF(CF_3)]_kO(CF_2)_u$CN wherein L represents an integer of 2 to 12; g represents an integer of 0 to 4; k represents 1 or 2; v represents an integer of 0 to 6; u represents an integer of 1 to 6, $R_f$ is a perfluoroalkylene or a bivalent perfluoroether group. Specific examples of nitrile containing liquid fluorinated monomers include perfluoro(8-cyano-5-methyl-3,6-dioxa-1-octene), $CF_2=CFO(CF_2)_5CN$, and $CF_2=CFO(CF_2)_3OCF(CF_3)CN$.

Bromine/iodine terminal end groups can be introduced as described in, e.g., EP 407 937, EP 101 930, and U.S. Pat. No. 4,243,770.

Particular examples of fluoropolymers that can be readily produced with the emulsifier free aqueous emulsion copolymerization of the invention include copolymers of TFE and P, copolymers of TFE and E, copolymers of TFE, HFP and P, copolymers of TFE, HFP and E, copolymers of CTFE, TFE and P, copolymers of TFE, VDF and P, copolymers of TFE, PVE and P and copolymers of TFE, E, P, and PVE. The fluoropolymers produced with the process of this invention are generally amorphous polymers or polymers having crystallinity and exhibiting a melting point of not more than 200° C., preferably not more than 100° C.

Apart from the fact that the polymerization is conducted using fluoropolymer particles or fluorinated liquid and (substantially) without an emulsifier, the polymerization is otherwise carried out in the usual manner. The initiator system used in the aqueous emulsion polymerization process of the present invention includes initiator systems that generate free radicals through a redox reaction such as for example a combination of an oxidizing agent and a reducing agent. Suitable oxidizing agents include persulfates including for example ammonium persulfate (APS), potassium persulfate (KPS) and sodium persulfate, preferably APS or KPS. Suitable reducing agents include sulfites, such as sodium sulfite, sodium bisulfite, a metabisulfite such as sodium or potassium bisulfite, pyrosulfites and thiosulfites, preferably $Na_2S_2O_5$, metal ions such as copper, iron, and silver. Another redox based initiation system that can be used includes manganese systems such as those deriving from potassium permanganate, $Mn^{3+}$—*salts (like manganese triacetate, manganese oxalate, etc.). The preferred metal salt is* $KMnO_4$.

Still further, the polymerization may be initiated with an initiator that decomposes thermally such as a persulfate. Thus, a persulfate can also be used on its own without presence of a reducing agent. Additionally peroxides such as hydroperoxide, peresters etc. can be used as initiators; a preferred system comprises tert-butyl hydroperoxide for example with/without Rongalit ($HO-CH_2-SO_2Na$).

The polymerization may further involve the use of a chain transfer agent. Suitable chain transfer agents include those selected from the group consisting of dialkyl ethers, hydrofluoroethers, alkanes in particular those having 1 to 5 carbon atoms and hydrofluorocarbon compounds. Examples of dialkyl ethers include dimethyl ether, diethyl ether and methyl t-butyl ether. Examples of alkanes include methane, ethane, propane, butane and n-pentane. Suitable hydrofluoroethers include those which have been disclosed in WO 00/32655. These hydrofluoroethers correspond to the formula $R_1-O-R_2$ wherein $R^1$ is a straight chain or branched saturated hydrocarbon group of 1 to 6 carbon atoms with the proviso that at least one hydrogen atom is attached to the carbon atom next to oxygen, and $R^2$ is a straight chain or branched fluorocarbon group or hydrofluorocarbon group of formula $C_aH_bF_c$ with a being 2 to 6, b being 0 to 2a−1 and c being 2 to 2a+1 and with the proviso that b+c is 2a+1. Examples of hydrofluoroethers include in particular methoxy nonafluorobutane and ethoxy nonafluorobutane which are both commercially available from 3M Company. Suitable hydrofluoroethers may also be represented by the formula $R_f-O-CH_3$, whereby $R_f$ can be a linear or branched partially fluorinated or perfluorinated rest of $C_1-C_{10}$. Suitable hydrofluorocarbons include compounds consisting of hydrogen and carbon that are either liquid or gaseous under ambient conditions of pressure and temperature.

Br/I-containing chain transfer agents to introduce Br/I-containing endgroups may also be used (see U.S. Pat. Nos. 4,000,356 or 6,380,337) herein incorporated by reference in their entirety.

The amount of chain transfer agent used is generally selected to obtain the desired molecular weight and is typically between 0.1 and 100 parts per thousand. The parts per thousand is based on the total weight of monomers fed to the polymerization reaction. The chain transfer agent concentration, e.g., dialkyl ether, may also be varied throughout the polymerization to influence the molecular weight distribution, i.e., to obtain a broad molecular weight distribution or to obtain a bimodal distribution.

The fluorinated olefin, hydrocarbon olefin and optional further monomers may be charged batchwise or in a continuous or semi-continuous manner after the polymerization has taken off. By semi-continuous is meant that a plurality of batches of the monomer are charged to the vessel during the course of the polymerization. The independent rate at which the monomers are added to the kettle will depend on the consumption rate of the particular monomer with time. Preferably, the rate of addition of monomer will equal the rate of consumption of monomer, i.e., conversion of monomer into polymer.

The reaction kettle is charged with water, the amounts of which are not critical. Generally, after an initial charge of monomer, the initiator system is added to the aqueous phase to initiate the polymerization. If fluoropolymer particles are to be produced in-situ, the initial charge of monomer will generally consist of the fluorinated olefin and/or optional fluorinated comonomers or the ratio of hydrocarbon olefin to fluorinated olefin is reduced relative to the feed ratio necessary to produce the fluoropolymer having the desired composition as has been described above. If priorly prepared fluoropolymer particles are used, these will generally be introduced in the polymerization kettle prior to initiation of the polymerization. Following the preparation of the fluoropolymer particles or addition thereof to the polymerization system, the feed ratio of hydrocarbon olefin to fluorinated olefin can be set at the desired ratio to produce the desired fluoropolymer. Fluorinated liquid in a suitable form, when used, will generally be fed to the polymerization shortly before initiating the polymerization reaction or while initiating the polymerization reaction. Typically, the fluorinated liquid is fed to the polymerization system until a substantial increase of the polymerization speed is noticed. However, feed of the fluorinated liquid may be continued even after the initial stage of the polymerization. The amount of the initiator system (for example combined amount of oxidizing and reducing agent or a persulfate on its own) added is typically between 0.01 and 0.2% by weight, preferably between 0.02 and 0.12% by weight based on the total amount of polymer dispersion produced. During the polymerization reaction, further amounts of initiator may be added. Such further addition during the polymerization may be carried out as a continuous feed or in separate discrete charges. Accelerators such as for example water soluble salts of iron, copper and silver may preferably be added.

During the initiation of the polymerization reaction, the sealed reactor kettle and its contents are generally pre-heated to the reaction temperature. Preferred polymerization temperatures are 10 to 100° C., preferably 30° C. to 80° C. and the pressure is typically between 2 and 30 bar, in particular 5 to 20 bar. The reaction temperature may be varied to influence the molecular weight distribution, i.e., to obtain a broad molecular weight distribution or to obtain a bimodal distribution.

The initial temperature to start the polymerization can be set higher, for example 10° C. to 50° C. higher, than during the rest of the polymerization to ensure a fast initiation rate; the time for this initiation period where the polymerization is carried at a higher temperature can be from 5 min to 60 min from the start of the polymerization reaction.

The amount of polymer solids that can be obtained at the end of the polymerization is typically between 10% and 45% and the average particle size measured by dynamic light scattering as the number average diameter of the resulting fluoropolymer is typically between 20 nm and 700 nm, preferably between 40 nm and 600 nm and most preferably between 80 nm and 500 nm.

Fluoropolymers produced with the process of the invention may be used to make fluoroelastomers, in particular when the fluoropolymer is amorphous or substantially amorphous such that the fluoropolymer hardly shows a melting point. A fluoroelastomer is generally produced by adding to the fluoropolymer a cure composition that causes crosslinking between the fluoropolymer chains. Depending on the nature of cure composition, it may be necessary that the fluoropolymer includes so called cure-sites as described above. For example, if a peroxide cure composition is used, it will be required that the fluoropolymer includes halogens that are capable of participating in the peroxide cure reaction. Cure reactions involving nitrile groups will typically require the presence of the latter as a cure site component in the fluoropolymer. Generally, a cure site component in the fluoropolymer will be used in small amounts, typically in amounts so as to obtain a fluoroelastomer that has between 0.1 and 5 mol % of cure sites, preferably 0.2 to 3 mol % and most preferred 0.5–2 mol %. The cure-site component may be introduced via a suitable comonomer having the particular cure-site or alternatively, the cure-site component can be introduced into the fluoropolymer with the use of a chain transfer agent that is appropriately functionalized to introduce the cure-site.

A curable fluoroelastomer composition will generally include the curable fluoropolymer and a cure composition comprising one or more curatives such as the peroxide and/or one or more catalysts depending on the type of cure sites contained in the curable fluoroelastomer. Suitable peroxide curatives are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, α,α'-bis(t-butylperoxy-diisopropylbenzene), and di[1,3-dimethyl-3-(t-butylperoxy)-butyl]carbonate. Generally, about 1–3 parts of peroxide per 100 parts of perfluoroelastomer is used.

Another material which is usually blended with the composition as a part of the curative system is a coagent composed of a polyunsaturated compound which is capable of cooperating with the peroxide to provide a useful cure. These coagents can be added in an amount equal to 0.1 and 10 parts per hundred parts per fluoroelastomer, preferably between 2–5 parts per hundred parts fluoroelastomer.

Examples of useful coagents include triallyl cyanurate; triallyl isocyanurate; tri(methylallyl isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate. Other useful coagents include the bis-olefins disclosed in EPA 0 661 304 A1, EPA 0 784 064 A1 and EPA 0 769 521 A1.

When the fluoropolymer includes a nitrile containing cure site component, a catalyst comprising one or more ammonia-generating compounds may be used to cause curing. "Ammonia-generating compounds" include compounds that are solid or liquid at ambient conditions but that generate ammonia under conditions of cure. Such compounds include, for example, aminophenols as disclosed in U.S. Pat. No. 5,677,389, ammonia salts (U.S. Pat. No. 5,565,512), amidoxines (U.S. Pat. No. 5,668,221), imidates, hexamethylene tetramine (urotropin), dicyan diamid, and metal-containing compounds of the formula:

$$A^{w+}(NH_3)_vY^{w-}$$

where $A^{w+}$ is a metal cation such as $Cu^{2+}$, $Co^{2+}$, $Co^{3+}$, $Cu^+$, and $Ni^{2+}$; w is equal to the valance of the metal cation; $Y^{w-}$ is a counterion, typically a halide, sulfate, nitrate, acetate or the like; and v is an integer from 1 to about 7. Still further ammonia generating compounds are disclosed in PCT 00/09603.

Fluoropolymers, in particular VDF containing fluoroelastomers, may further be cured using a polyhydroxy curing system. In such instance, it will not be required that the fluoropolymer includes cure site components. The polyhydroxy curing system generally comprises one or more polyhydroxy compounds and one or more organo-onium accelerators. The organo-onium compounds useful in the present invention typically contain at least one heteroatom, i.e., a non-carbon atom such as N, P, S, O, bonded to organic or inorganic moieties. One useful class of quaternary organo-onium compounds broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.).

Many of the organo-onium compounds useful in this invention are described and known in the art. See, for example, U.S. Pat. Nos. 4,233,421 (Worm), U.S. Pat. No. 4,912,171 (Grootaert et al.), U.S. Pat. No. 5,086,123 (Guenthner et al.), and U.S. Pat. No.5,262,490 (Kolb et al.), U.S. Pat. No. 5,929,169, all of whose descriptions are herein incorporated by reference. Another class of useful organo-onium compounds include those having one or more pendent fluorinated alkyl groups. Generally, the most useful fluorinated onium compounds are disclosed in U.S. Pat. No. 5,591,804.

The polyhydroxy compound may be used in its free or non-salt form or as the anionic portion of a chosen organo-onium accelerator. The crosslinking agent may be any of those polyhydroxy compounds known in the art to function as a crosslinking agent or co-curative for fluoroelastomers, such as those polyhydroxy compounds disclosed in U.S. Pat. Nos. 3,876,654 (Pattison), and U.S. Pat. No. 4,233,421 (Worm). One of the most useful polyhydroxy compounds includes aromatic polyphenols such as 4,4'-hexafluoroisopropylidenyl bisphenol, known more commonly as bisphenol AF. The compounds 4,4'-dihydroxydiphenyl sulfone (also known as Bisphenol S) and 4,4'-isopropylidenyl bisphenol (also known as bisphenol A) are also widely used in practice.

Prior to curing, an acid acceptor is mixed into a fluoroelastomer composition that comprises a polyhydroxy cure system. Acid acceptors can be inorganic or blends of inorganic and organic. Examples of inorganic acceptors include magnesium oxide, lead oxide, calcium oxide, calcium hydroxide, dibasic lead phosphite, zinc oxide, barium carbonate, strontium hydroxide, calcium carbonate, etc. Organic acceptors include epoxies, sodium stearate, and magnesium oxalate. The preferred acid acceptors are magnesium oxide and calcium hydroxide. The acid acceptors can be used singly or in combination, and preferably are used in amounts ranging from about 2 to 25 parts per 100 parts by weight of the fluoroelastomer.

A curable fluoroelastomer composition may comprise further additives, such as carbon black, stabilizers, plasticizers, lubricants, fillers, and processing aids typically used in fluoroelastomer compounding can be incorporated into the compositions, provided they have adequate stability for the intended service conditions.

Carbon black fillers are typically also employed in elastomers as a means to balance modulus, tensile strength, elongation, hardness, abrasion resistance, conductivity, and processability of the compositions. Suitable examples include MT blacks (medium thermal black) designated N-991, N-990, N-908, and N-907, and large particle size furnace blacks. When used, 1–70 phr of large size particle black is generally sufficient.

Fluoropolymer fillers may also be present in the curable compositions. Generally, from 1 to 50 parts per hundred fluoroelastomer of a fluoropolymer filler is used. The fluoropolymer filler can be finely divided and easily dispersed as a solid at the highest temperature utilized in fabrication and curing of the fluoroelastomer composition. By solid, it is meant that the filler material, if partially crystalline, will have a crystalline melting temperature above the processing temperature(s) of the fluoroelastomer(s).

The curable compositions can be prepared by mixing the fluoropolymer, the curatives and/or catalysts, the selected additive or additives, and the other adjuvants, if any, in conventional rubber processing equipment. The desired amounts of compounding ingredients and other conventional adjuvants or ingredients can be added to the unvulcanized fluorocarbon gum stock and intimately admixed or compounded therewith by employing any of the usual rubber mixing devices such as internal mixers, (e.g., Banbury mixers), roll mills, or any other convenient mixing device. For best results, the temperature of the mixture during the mixing process typically should not rise above about 120° C. During mixing, it is preferable to distribute the components and adjuvants uniformly throughout the gum for effective cure. The mixture is then processed and shaped, for example, by extrusion (for example, in the shape of a hose or hose lining) or molding (for example, in the form of an O-ring seal). The shaped article can then be heated to cure the gum composition and form a cured elastomer article.

Processing of the compounded mixture (i.e., press cure) usually is conducted at a temperature between about 95° C. and about 230° C., preferably between about 150° C. and about 205° C., for a period of from 1 minute to 15 hours, typically from 5 minutes to 30 minutes. A pressure of between about 700 kPa and about 20,600 kPa is usually imposed on the compounded mixture in the mold. The molds first may be coated with a release agent and prebaked. The molded vulcanizate is then usually post-cured (e.g., oven-cured) at a temperature usually between about 150° C. and about 300° C., typically at about 232° C., for a period of from about 2 hours to 50 hours or more depending on the cross-sectional thickness of the article. For thick sections, the temperature during the post cure is usually raised gradually from the lower limit of the range to the desired maximum temperature. The maximum temperature used is preferably about 300° C., and is held at this value for about 4 hours or more.

The curable fluoroelastomer compositions are useful in production of articles such as gaskets, tubing, and seals. Such articles are produced by molding a compounded formulation of the curable composition with various additives under pressure, curing the part, and then subjecting it to a post cure cycle. The curable compositions formulated without inorganic acid acceptors are particularly well suited for applications such as seals and gaskets for manufacturing semiconductor devices, and in seals for high temperature automotive uses.

The invention will now be further illustrated with reference to the following examples without the intention to limit the invention thereto. All parts and percentages are by weight unless indicated otherwise.

EXAMPLES

Test Methods

The melt flow index (MFI) was carried out according to DIN 53735, ISO 12086 or ASTM D 1238 at a support weight of 5.0 kg and a temperature of 265° C. or 297° C. alternatively. The MFIs cited here were obtained with a standardized extrusion die of 2.1 mm diameter and a length of 8.0 mm.

Mooney viscosities were determined in accordance with ASTM D 1646. Unless otherwise noted, the Mooney viscosity was determined from compositions containing only fluoroelastomer gum incorporating curatives or the final compound using a 1 minute pre-heat and a 10 minute test at 121° C. (ML 1+10 @ 121° C.).

Melting peaks of the fluororesins were determined according to ASTM 4591 by means of Perkin-Elmer DSC 7.0 under nitrogen flow and a heating rate of 10° C./min. The indicated melting points relate to the melting peak maximum.

Solution viscosities of diluted polymer solutions was determined on a 0.2% polymer solution in methylethylketone (MEK) at 35° C. in accordance to DIN 53726. A Cannon-Fenske-Routine-Viskosimeter (Fa. Schott, Mainz/Germany) fulfilling ISO/DIS 3105 and ASTM D 2515 was used for the measurements.

The latex particle size determination was conducted by means of dynamic light scattering with A Malvern Zetazizer 1000 HAS in accordance to ISO/DIS 13321. Prior to the measurements, the polymer latexes as yielded from the polymerizations were diluted with 0.001 mol/L KCl-solution. The measurement temperature was 20° C. in all cases.

Example 1

Comparative Example

A polymerization kettle with a total volume of 47.5 l equipped with an impeller agitator system was charged with 29.0 l deionized water, 107 g $K_2HPO_4$ and 487 g 30% aqueous ammonium perfluorooctanoate solution (FX-1006 from 3M Company). At 71° C. and an agitator speed of 240 rpm the oxygen-free kettle was pressurized with 15 g propylene to 0.9 bar absolute, with 666 g vinylidene fluoride (VDF) to 11.9 bar absolute and with 421 g tetrafluoroethylene (TFE) to 16.0 bar absolute reaction pressure. The polymexization was initiated by feeding 129 g APS (amunonium peroxodisulfate) dissolved in water. As the reaction started, the reaction pressure of 16.0 bar absolute was maintained by the feeding TFE, propylene and VDF into the gas phase with a feeding ratio propylene (kg)/TFE (kg) of 0.228 and VDF (kg)/TFE (kg) of 0.526. The reaction temperature of 71° C. was also maintained. When 4463 g TFE feed was completed after 430 min the monomer valves were closed. The obtained polymer latex was free of coagulum, had a solid content of 20

The isolated polymer shows no discernible melting transition and a glass transition temperature of −8.6° C. (midpoint value). The polymer had a solution viscosity of 72 ml/g.

Example 2

Comparative

The polymerization of example 1 was repeated with the only exception that no ammonium perfluorooctanoate solution was charged. After pressurizing the kettle with propylene, VDF and TFE (same amounts as for example 1), the polymerization was initiated by feeding 129 g APS (ammonium peroxodisulfate) dissolved in water. No discernible polymerization start could be monitored and no monomer feed was needed to maintain the pressure of 16.0 bar absolute. After 75 min still no discernible polymerization took place, the reactor was vented and flushed with $N_2$ in three cycles. The obtained reaction mixture was totally clear and showed a very high foaming potential and had a solid content of 0.2%. The dried solids appeared as brown wax with an unpleasant smell, indicative of low molecular weight oligomers formed.

Example 3

The polymerization kettle used for example 1 was charged with 29.01 deionized water and was heated up to 7° C., the agitation system was set to 240 rpm. The kettle was pressurized with 665 g vinylidene fluoride (VDF) to 11.3 bar absolute 451 g tetrafluoroethylene (TFE) to 16.0 bar absolute reaction pressure, no propylene was precharged this time. The polymerization was initiated by feeding 40 g APS (ainmonium peroxodisulfate) dissolved in water. As the reaction started, the reaction pressure of 16.0 bar absolute was maintained by the feeding TFE and VDF into the gas phase with a feeding ratio VDF (kg)/TFE (kg) of 0.526. The reaction temperature of 71° C. was also maintained. When 80 g TFE feed was completed after 8 min, another 89 g of APS dissolved into water was additionally charged into the kettle and propylene was also fed with a feeding ratio propylene (kg)/TFE (kg) of 0.228. When 4463 g TFE feed was completed alter 442 min the monomer valves were closed. The so obtained polymer dispersion was also free of coagulum, had a solid content of 20.4% and the latex particle diameter was 214 nm according to dynamic light scattering.

The isolated polymer shows no discernible melting transition and a glass transition temperature of −8.2° C. (midpoint value). The polymer had a solution viscosity of 68 ml/g.

Example 4

The same polymerization kettle as used for example 1 was charged with 29.0 l deionized water and was heated up to 50° C., the agitation system was set to 240 rpm. Further 1.7 g sodium disulfite ($Na_2S_2O_5$), 55 mg copper sulfate ($CuSO_4$), and 1 g 25% aqueous ammonia solution have been added. The kettle was then pressurized with 60 g PPVE-2 (fed as hot spray by a steam heated aerosol nozzle) to 0.6 bar absolute, with 647 g PPVE-1 to 2.1 bar absolute, with 460 g vinylidenedifluoride (VDF) to 10.3 bar absolute and with 498 g tetrafluoroethylene (TFE) to 15.5 bar absolute reaction pressure. The polymerization was initiated by feeding 40 g APS (ammonium peroxodisulfate) dissolved in water. As the reaction started, the reaction temperature is increased from 50° C. to 60° C. within 10 min. Further, the reaction pressure of 15.5 bar absolute is maintained by the feeding TFE, PPVE-1 and VDF into the gas phase with a feeding ratio PPVE-1 (kg)/TFE (kg) of 1.386 and VDF (kg)/TFE (kg) of 1.809. Within the polymerization, PPVE-2 is additionally fed as heated aerosol with a feeding a feeding rate 30 g/h. After the feeding of 675 g TFE is completed after 35 min, the monomer valves are closed and the monomer gas phase is reacted down to a vessel pressure of 7.6 within 10 min. The reactor is vented and flushed with $N_2$ in three cycles.

The so obtained dispersion had a solid content of 9% and an average particle size of 118 nm according to dynamic light scattering. The polymer formed shows no discernible melting transition and a glass transition temperature of −20.6° C. This polymer dispersion was used as seed material for a following polymerization.

3.2 kg of this seed dispersion was again placed into the same polymerization kettle which was further charged with 26.0 l deionized water and was heated up to 71° C. The kettle was then pressurized with 15 g propylene to 0.9 bar absolute, with 668 g vinylidenedifluoride (VDF) to 11.9 bar absolute and with 426 g tetrafluoroethylene (TFE) to 16.0 bar absolute reaction pressure. The polymerization was initiated by 129 g APS (ammonium peroxodisulfate) dissolved in water and the reaction pressure of 16.0 bar absolute was maintained by the feeding TFE, propylene and VDF into the gas phase with a feeding ratio propylene (kg)/TFE (kg) of 0.228 and VDF (kg)/TFE (kg) of 0.526 as the reaction started. The reaction temperature of 71° C. was also maintained. When 4463 g TFE feed was completed after 421 min the monomer valves were closed. Finally, the reactor was vented and flushed with $N_2$ in three cycles. The obtained polymer dispersion was free of coagulum, had a solid content of 21.9% and the latex particle diameter was 335 nm according to dynamic light scattering. The polymer shows no melting transition and a glass transition temperature of −8.9° C. (midpoint value). The polymer had a solution viscosity of 74 ml/g.

Example 5

The polymerization kettle as used for example 1 was charged with 29.01 deionized water and was boated up to 60° C. The agitation system was set to 240 rpm. The kettle was pressurized with 5 g propylene to 0.4 bar absolute, with 671 g vinylidene fluoride (VDF) to 11.9 bar absolute and with 429 g tetrafluoroethylene (TFE) to 16.0 bar absolute reaction pressure. Additionally, 65 g of Fluoroinert™ FC-70 (commercially available from 3M Company) were added into the kettle as hot spray introduced into the kettle by a steam heated aerosol nozzle. The polymerization was initiated by feeding 40 g APS (ammonium peroxodisulfate)

dissolved in water. The reaction pressure of 16.0 bar absolute was maintained by the feeding TFE, propylene and VDF into the gas phase with a feeding ratio propylene (kg)TFE (kg) of 0.076 and VDF (kg)/TFE (kg) of 0.526 as the reaction started. The feeding ratio of propylene (kg)/TFE (kg) was increased to 0.228 after 9 min and the reaction temperature of 60° C. was raised to 71° C. within 10 min. After that the reaction temperature of 71° C. was maintained. Within the polymerization, PPVE-2 is additionally fed as heated aerosol with a feeding a feeding rate 12 g/h. Another portion of 40 g APS was added after 2 h and 4 h polymerization time. The TFE feed of 4463 g was completed after 365 min and the monomer valves were closed. The obtained polymer dispersion was also free of coagulum, had a solid content of 20.1% and the latex particle diameter was 287 nm according to dynamic light scattering. The polymer shows a glass transition temperature of −8.5° C. (midpoint value) and a solution viscosity of 81 ml/g.

A number of embodiments of the invention have been described. Nevertheless, it will be understood that various modifications may be made without departing from the spirit and scope of the invention. All publications and patents cited herein are incorporated by reference to the same extent as if each individual publication or patent was specifically and individually indicated to be incorporated by reference.

The invention claimed is:

1. Process comprising polymerizing a fluorinated olefin and a hydrocarbon olefin selected from ethylene, propylene and mixtures thereof, to give a copolymer, wherein polymerizing is a substantially emulsifier free aqueous emulsion polymerization in the presence of fluoropolymer particles and/or in the presence of fluorinated liquid having a boiling point of at least 50° C., wherein said copolymer contains recurring units deriving from the hydrocarbon olefin in an amount of 10 to 70 mol % relative to the total amount of recurring units in the copolymer.

2. Process according to claim 1 wherein said fluoropolymer particles are formed in-situ by polymerizing part of said fluorinated olefin without substantially copolymerizing said hydrocarbon olefin.

3. Process according to claim 2, wherein the fluoropolymer particles formed in-situ, amount to not more than 20% by weight of the total weight of fluoropolymer produced.

4. Process according to claim 1 wherein said fluorinated liquid is an inert fluorinated hydrocarbon wherein all of the hydrogen atoms have been replaced with fluorine atoms.

5. Process according to claim 1 wherein said fluoropolymer particles have an average diameter of not more than 150 nm.

6. Process according to claim 1 wherein a suitable form of said fluorinated liquid is obtained by passing the fluorinated liquid through a nozzle thereby forming an aerosol or wherein said suitable formed is obtained by introducing the fluorinated liquid as a gas into a polymerization kettle and allowing it to condense therein.

7. Process according to claim 1 wherein said fluoropolymer particles are provided at the initial stage of the polymerization.

8. Process according to claim 1 wherein said fluorinated olefin is selected from the group consisting of tetrafluoroethylene, vinylidene fluoride, chlorotrifluoroethylene, hexafluoropropylene and mixtures thereof.

9. Process according to claim 1 wherein said copolymer is a copolymer of said fluorinated olefin and said hydrocarbon olefin and one or more fluorinated or non-fluorinated comonomers mid said process involves the copolymerization of said fluorinated olefin, said hydrocarbon olefin and said one or more fluorinated or non-fluorinated comonomers.

10. Process according to claim 9 wherein said fluorinated comonomer comprises a fluorinated vinyl ether.

11. Process according to claim 1 wherein the copolymer has a melting point of less than 200° C. or wherein said copolymer is substantially amorphous.

12. Process according to claim 1 wherein said polymerization is thermally initiated or redox initiated.

13. Process according to claim 1 wherein said polymerization is initiated with an initiator composition comprising a persulfate, a peroxide or a permanganate.

* * * * *

UNITED STATES PATENT AND TRADEMARK OFFICE
CERTIFICATE OF CORRECTION

PATENT NO. : 7,064,170 B2
APPLICATION NO. : 10/690088
DATED : June 20, 2006
INVENTOR(S) : Harald Kaspar It is certified that error appears in the above-identified patent and that said Letters Patent is hereby corrected as shown below:

On Title Page (item 56)
Column 1
First Page, U.S. Patent Documents, Line 4, delete "Zuzaemon" and insert -- Juzaemon -- in place thereof.

Column 2
First Page, U.S. Patent Documents, Line 17, delete "B1" following "6,380,337" and insert -- B2 -- in place thereof.
First Page, U.S. Patent Documents, Line 20, delete "B1" following "6,693,152" and insert -- B2-- in place thereof.
First Page., U.S. Patent Documents, Line 22, delete "B1" following "6,825,250" and insert -- B2 -- in place thereof.

Column 6
Lines 12-16, below "carbon atoms." delete "Examples of ............. (PPVE-1) and" and insert same following "carbon atoms.".

Column 7
Lines 36-37, delete "$Mn^{3+}$ -salts (like manganese triacetate, manganese oxalate, etc.). The preferred metal salts is $KMnO_4$." and insert -- $MN^{3+}$ -salts (like manganese triacetate, manganese oxalate, etc.). The preferred metal salts is $KMnO_4$. -- in place thereof.

Column 10
Line 50, delete "Nos." and insert -- No. -- in place thereof.
Line 65, delete "Nos." and insert -- No. -- in place thereof.

Column 13
Line 7, delete "polymexization" and insert -- polymerization -- in place thereof.
Lines 7-8, delete "(amunonium" and insert -- (ammonium -- in place thereof.
Lines 45-46, delete "7°C.," and insert -- 71°C., -- in place thereof.
Line 51, delete "(ainmonium" and insert -- (ammonium -- in place thereof.
Line 60, delete "alter" and insert -- after -- in place thereof.

Column 14
Line 58, delete "boated" and insert -- heated -- in place thereof.

UNITED STATES PATENT AND TRADEMARK OFFICE
CERTIFICATE OF CORRECTION

PATENT NO. : 7,064,170 B2
APPLICATION NO. : 10/690088
DATED : June 20, 2006
INVENTOR(S) : Harald Kaspar It is certified that error appears in the above-identified patent and that said Letters Patent is hereby corrected as shown below:

Column 15
Line 3, delete "(kg)TFE" and insert -- (kg)/TFE -- in place thereof.

Column 16
Line 26, Claim 9, delete "mid" and insert -- and -- in place thereof.

Signed and Sealed this

Twelfth Day of December, 2006

JON W. DUDAS
*Director of the United States Patent and Trademark Office*